United States Patent [19]
Collins

[11] Patent Number: 5,207,452
[45] Date of Patent: May 4, 1993

[54] REMOVABLE SEAT BELT GUIDE RING

[75] Inventor: Cecil A. Collins, Shelby Township, Oceana County, Mich.

[73] Assignee: General Safety Corporation, St. Clair Shores, Mich.

[21] Appl. No.: 837,630

[22] Filed: Feb. 13, 1992

[51] Int. Cl.⁵ .............................................. B60R 22/18
[52] U.S. Cl. ................................. 280/801 R; 280/808
[58] Field of Search ............... 280/801, 808; 297/483, 297/482, 468; 24/196, 198

[56] References Cited

U.S. PATENT DOCUMENTS

| | | | |
|---|---|---|---|
| 3,550,955 | 12/1970 | Nicholas | 297/482 |
| 4,318,552 | 3/1982 | Seifert et al. | 280/801 |
| 4,527,313 | 7/1985 | Sylven et al. | 297/483 X |
| 4,618,165 | 10/1986 | Seifert et al. | 297/483 X |

FOREIGN PATENT DOCUMENTS

| | | | |
|---|---|---|---|
| 78945 | 5/1983 | European Pat. Off. | 280/801 |
| 180306 | 5/1986 | European Pat. Off. | 280/801 |
| 2228127 | 1/1974 | Fed. Rep. of Germany | 297/468 |
| 2607170 | 9/1977 | Fed. Rep. of Germany | 280/801 |
| 4248 | 1/1980 | Japan | 280/801 |
| 2147795 | 5/1985 | United Kingdom | 280/801 |

Primary Examiner—Russell D. Stormer
Assistant Examiner—Gary C. Hoge
Attorney, Agent, or Firm—Harness, Dickey & Pierce

[57] ABSTRACT

A removable seat belt guide ring assembly that is adapted to be anchored to the frame of the vehicle for routing the webbing over the shoulder of the occupant of the seat. The guide ring comprises a unitary triangular-shaped member having a base portion and integral supporting arms with overlapping free ends forming flattened mounting tabs that are offset with respect to each other to permit the guide ring to be installed onto the webbing. A trim cover placed over the bolt that mounts the guide ring to the frame of the vehicle cooperates with the base portion of the guide ring to define a narrow guideway to permit the webbing to pass freely therethrough while preventing the belt from twisting. The guide ring may be installed at any time in the automobile assembly process, and may be easily removed for replacement without requiring removal of the entire seat belt system.

21 Claims, 3 Drawing Sheets

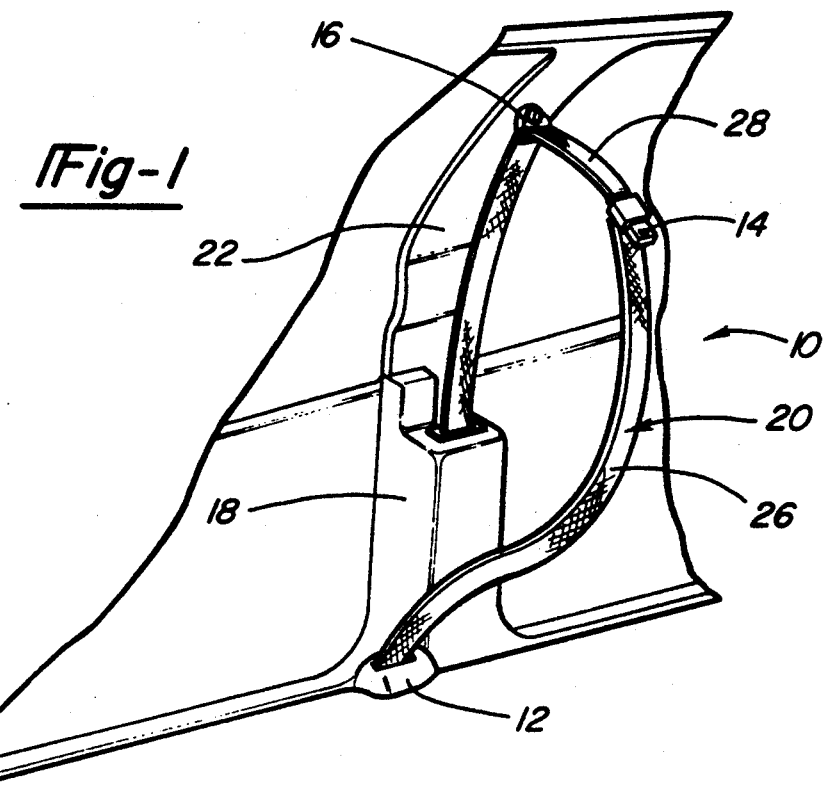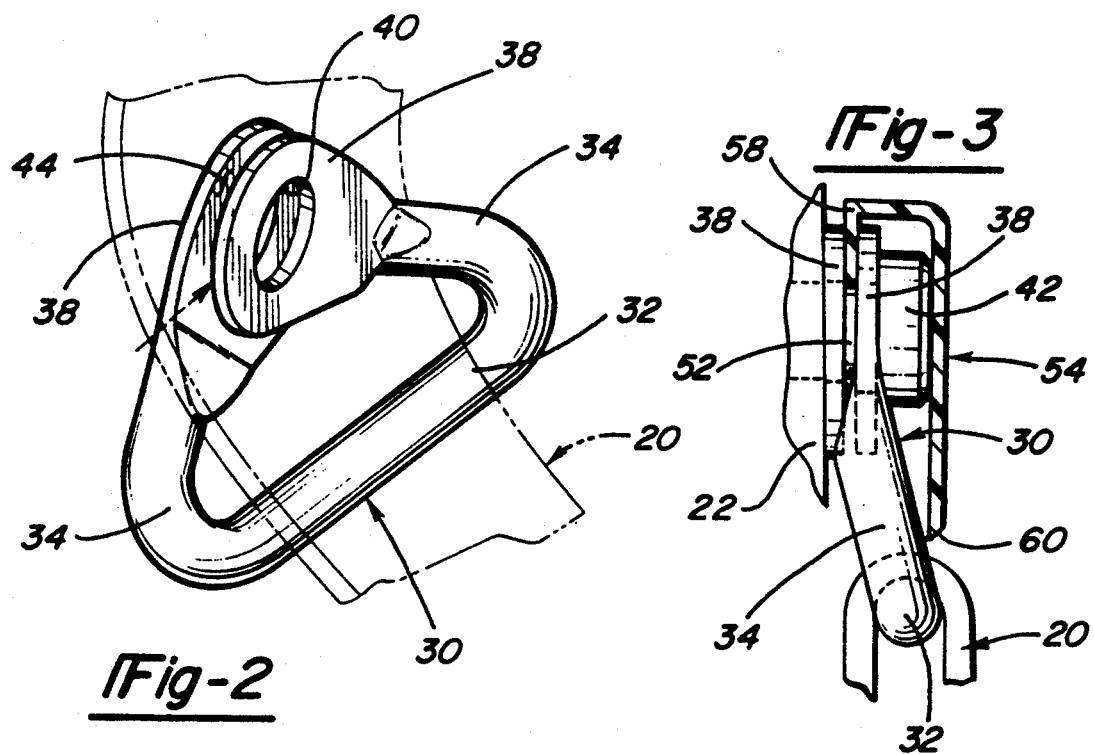

REMOVABLE SEAT BELT GUIDE RING

FIELD OF THE INVENTION

The present invention relates generally to seat belt systems for automobiles and, more particularly, to the guide ring anchor for the shoulder restraint portion of an automobile seat belt system.

BACKGROUND OF THE INVENTION

Automobile seats are equipped with seat belts to restrain forward and lateral motion of the occupant during a collision. The seat belt often includes both a lap belt and an upper torso or shoulder restraint portion. In most present-day vehicles, the shoulder and lap belts are combined in a single belt system. In particular, the seat belt for the front seat of a vehicle is typically anchored at a first end to the frame of the vehicle, usually near the floorpan alongside and toward the rear of the seat, and at the other end to a retractor assembly which is typically mounted at the base of the B-pillar of the vehicle. In order to ensure that the belt is properly routed over the shoulder of the occupant of the seat, a guide ring is provided that is generally mounted toward the top of the B-pillar so that the belt emanating from the retractor is initially routed upwards along the B-pillar and through the guide ring. The tongue plate for the seat belt buckle is attached to the seat belt intermediate the guide ring and the first anchor point. Typically, the position of the tongue plate on the seat belt can be slidably adjusted to accommodate fore and aft adjustment in the position of the seat as well as variations in the size of the occupant.

The guide ring is typically formed as a unitary metal loop that defines a guideway through which the belt is allowed to freely pass. Generally, the configuration of the guideway opening is only slightly larger than that necessary to accommodate the belt to prevent the belt from twisting as its passes through the guide ring.

However, once installed, the one-piece guide ring cannot be removed or replaced without disassembling or removing either the entire seat belt assembly or by cutting the belt at the first anchor point and subsequently re-stitching the belt to the anchor mounting tab. Both of these solutions are, of course, costly and impractical.

SUMMARY OF THE INVENTION

The present invention comprises a removable guide ring for the shoulder restraint portion of an automobile seat belt system. The guide ring may be removed and replaced without dismantling or removing either the rigid anchor mount or the webbing retractor from the automobile frame. In addition, the guide ring may be slipped onto the seat belt webbing and mounted onto the vehicle frame after assembly and installation of the seat belt system.

In general, the guide ring of the present invention comprises a generally triangular-shaped member having a base portion of sufficient length to accommodate the width of the belt, and side portions that overlap at their free ends. The overlapping end portions comprise flattened tab portions that are spaced from each other by a distance slightly greater than the thickness of the belt to permit the guide ring to be slipped onto the belt. Aligned holes formed in the overlapping tab portions enable the guide ring to be bolted to the B-pillar of the vehicle. Preferably, a cover is fastened to the guide ring which presents a lower surface that is spaced slightly above the base portion of the guide ring to define a narrow guideway for confining the belt and preventing it form twisting when pulled through the guide ring.

Accordingly, it is the primary object of the present invention to provide a guide ring for a seat belt system that can be readily installed independently of the seat belt system and consequently can be easily removed and replaced without cutting the belt or removing the entire seat belt system.

These and other advantages and features will become apparent from the following description and claims in conjunction with the accompanying drawings.

BRIEF DESCRIPTION OF THE DRAWINGS

FIG. 1 is a partial perspective view of an automobile seat belt system;

FIG. 2 is a perspective view of the guide ring according to the present invention;

FIG. 3 is a side view of the guide ring assembly of the present invention;

DETAILED DESCRIPTION OF THE PREFERRED EMBODIMENT

Figure 4:
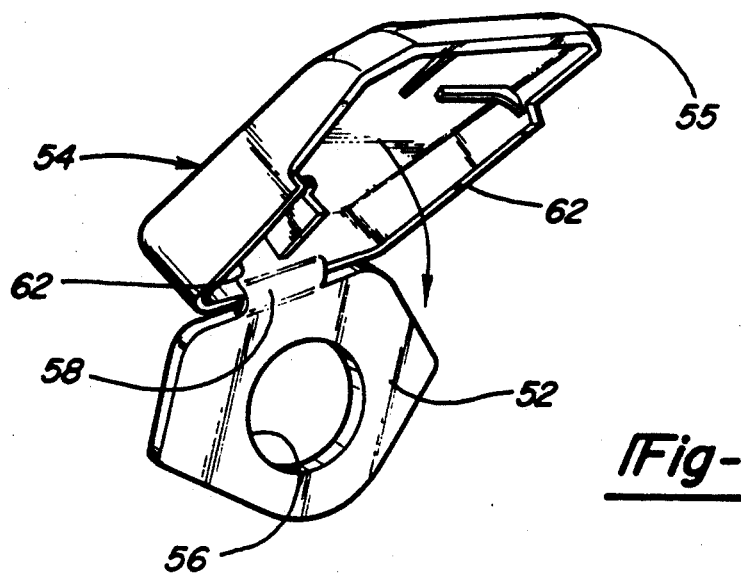
FIG. 4 is a perspective view of the trim cover of the guide ring assembly of the present invention.

Referring to FIG. 1, a diagram of a conventional shoulder and lap belt system 10 for the front seat of a vehicle is shown. The belt system 10 comprises a rigid anchor mount 12, a tongue plate 14, a guide ring assembly 16, and a retractor assembly 18. The seat belt 20 is firmly affixed at one end to the automobile frame by the rigid anchor mount 12. The tongue plate 14 is located on the seat belt 20 and may frictionally slide along the seat belt 20 in a restricted fashion. The tongue belt 14 is adapted for insertion into a seat belt buckle (not shown) mounted on the opposite side of the seat in a conventional manner. The rigid anchor mount 12, tongue plate 14, buckle 24, and intermediate portion 26 of the seat belt 20 collectively from the lap portion of the seat belt system 10. The seat belt 20 further passes through the guide ring assembly 16 which is anchored to the B-pillar 22 of the automobile frame and is then routed downward along the B-pillar to the retractor assembly 18 mounted to the base of the B-pillar 22. The tongue plate 14, guide ring assembly 16, and the belt portion 28 therebetween comprise the shoulder portion of the belt system 10. The retractor assembly 19 is of conventional design which allows the belt 20 to extend and retract as necessary, and locks the belt to prevent further extension of the belt whenever a deceleration rate above a predetermined threshold is sensed.

FIGS. 2 and 3 show the removable seat belt guide ring 30 according to the present invention. The guide ring 30 comprises a generally triangular-shaped member which in the preferred embodiment is formed from a steel rod. The guide ring 30 includes a substantially straight base portion 32 having a length slightly greater than the width of the belt 20 to enable the belt to pass freely over the base portion 32. The integral side portions or support arms 34 of the guide ring are angled inwardly so as to form equivalent acute angles with respect to the base portion 32. The free ends of the support arms 34 are flattened to create tab portions 38 which overlap each other in the manner shown in FIG. 2. Aligned mounting holes 40 are formed through the tab portions 38 for receiving an anchor bolt 42 to secure the guide ring 30 to the B-pillar 22 of the vehicle. Importantly, the offset 44 created between the overlapping tab portions 38 is slightly greater than the thickness of the belt to allow insertion of the belt 20 through the guide ring as depicted in phantom in FIG. 2. Additionally, as best shown in FIG. 3, the flattened tab portions 38 are angled or bent relative to the remainder of the guide ring so that the guide ring 30 extends outwardly from the surface to which it is mounted. In this manner, the belt 20 is able to freely pass over the base portion 32 of the guide ring 20, as shown in FIG. 3, without interference form the B-pillar 22 of the vehicle.

Figure 5:
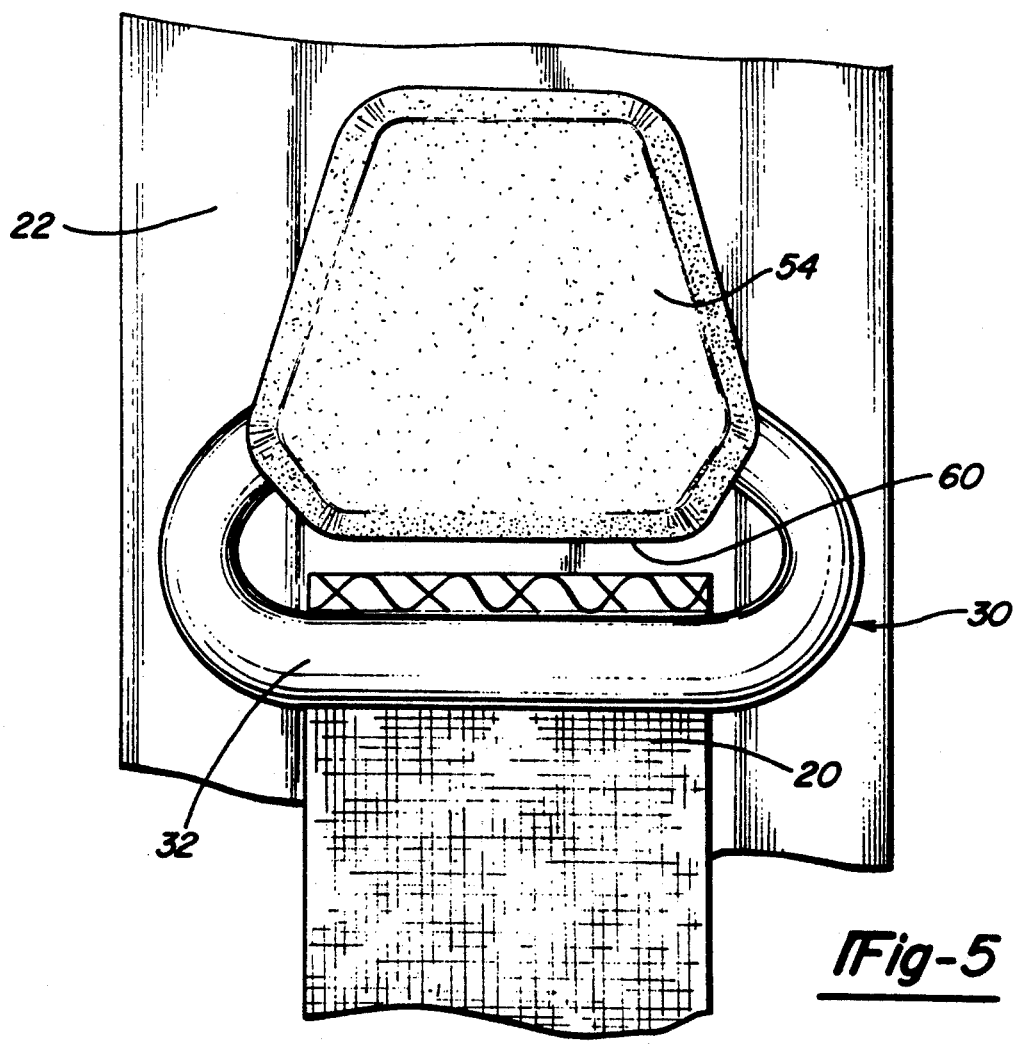
FIG. 5 is a plan view of the guide ring assembly of the present invention installed on a vehicle.

The seat belt guide ring 30 is installed onto the seat belt assembly by inserting the seat belt 20 between the tab portions 38 so that the seat belt 20 overlaps the base portion 32 of the guide ring as shown in FIG. 3. The trim cover 54 for the guide ring assembly 16 is shown in FIG. 4. The trim cover 54 preferably comprises a molded plastic trim piece that includes a spacer tab portion 52 and a main body portion 55. The spacer tab portion 52 of the trim cover 54 is adapted to be inserted between the tab portions 38 of the guide ring so that the mounting hole 56 formed in the spacer 52 of the trim cover 54 is aligned with the mounting holes 40 formed in the tab portions 38 of the guide ring. An anchor bolt 42 is then passed through the mounting holes 40,56 and secured to the B-pillar 22 of the vehicle. The trim cover 54 is formed with a living hinge 58 intermediate the spacer portion 52 and the main body portion 55 of the cover 54 to allow access to the anchor bolt 42. The main body portion 55 of the cover 54 is then pivoted about the hinge 58 until the side flanges 62 of the trim cover snap onto the spacer portion 52. When secured, as shown in FIG. 5, the trim cover 54 presents a relatively straight lower edge 60 that is spaced slightly above the base portion 32 of the guide ring. The resulting guideway created between the lower edge 60 of the trim cover 54 and the base portion 32 of the guide ring is sufficient to permit the belt to move freely over the guide ring while preventing the belt from twisting or "roping" as it is drawn through the guide ring.

Figure 6:
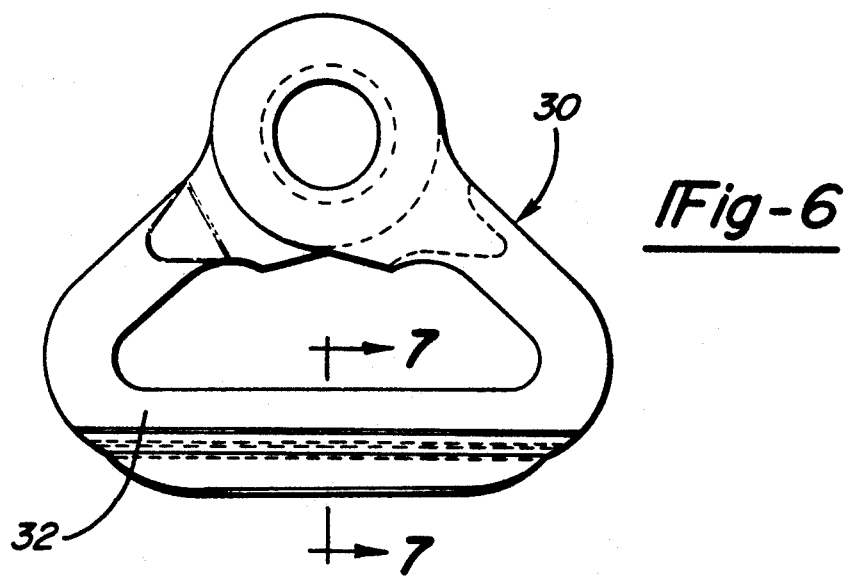
FIG. 6 is a plan view of the guide ring showing an alternative embodiment of the present invention.
Figure 7:
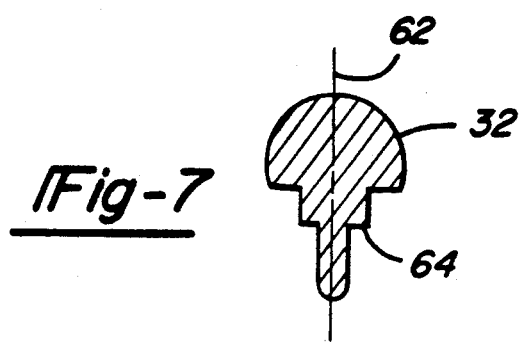
FIG. 7 is a partial cross-section of an alternative embodiment of the present invention.

A first alternative embodiment of the present invention is shown in FIGS. 6 and 7, in which like reference numerals indicate comparable components. The guide ring 30 is constructed with a reinforced base portion 32 to reduce the possibility of deformation of the guide ring 30 under the severe loading conditions of the seat belt system that can occur during a collision. In particular, in this embodiment the base portion is strengthened by plastically deforming the lower region so that is cross-section extends a greater distance along the Y-axis 62 (FIG. 7). The base portion 32 is preferably formed with a two-step rib 64 for ease of manufacture.

Figure 8:
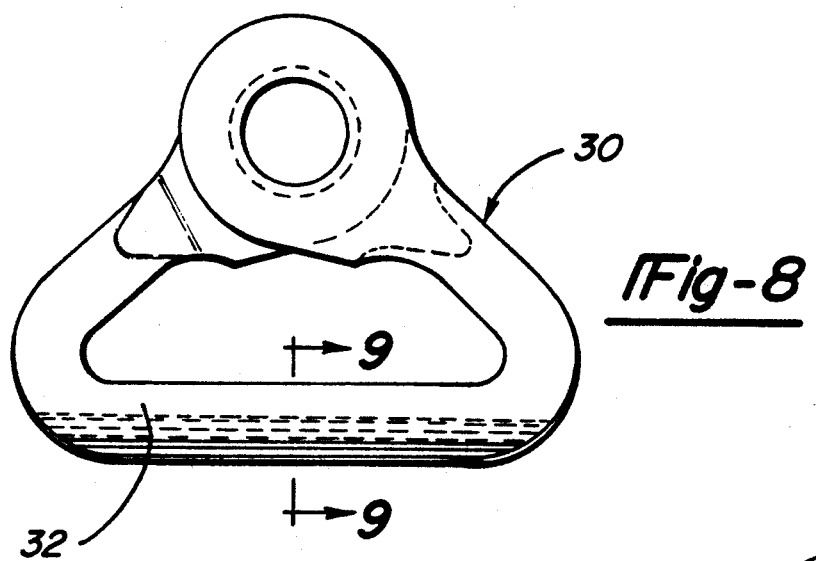
FIG. 8 is a plan view of the guide ring showing a second alternative embodiment of the present invention.
Figure 9:
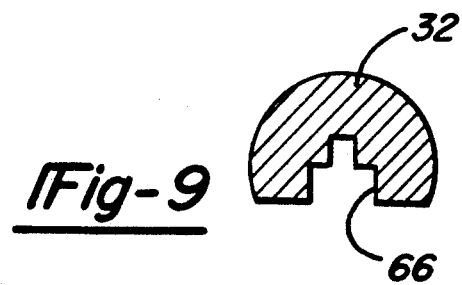
FIG. 9 is a partial cross-section of a second alternative embodiment of the present invention.

A second alternative embodiment of the present invention is shown in FIGS. 8 and 9. In this embodiment, the upper region of the base portion 32 where the belt 20 rests has an increased radius relative to the embodiment shown in FIGS. 2 and 3, which provides more surface area supporting the belt 20. Because pressure varies inversely with surface area, a greater surface area results in a lower pressure for a given tension in the belt 20. A larger radius base portion 32 allows the belt 20 to bend under tension around a more gradual curve, and so is less likely to deform the guide ring 30. In the embodiment shown in FIGS. 8 and 9, the radius of the upper region of base portion 32 is increased by plastically deforming and compressing upwardly and inwardly the lower region of the base portion 32. Again, the resulting channel 66 created in the underside of the base portion 32 is preferably formed with a two-stepped configuration for ease of manufacturing.

Additional benefits and advantages of the present invention will become apparent to those skilled in the art to which the invention relates from the subsequent description of the preferred embodiments and the appended claims, taken in conjunction with the accompanying drawings:

What is claimed is:

1. A guide ring assembly for a seat belt assembly including webbing that is anchored to the vehicle at one end and connected to a retractor assembly at its other end so as to define an intermediate webbing portion therebetween and a tongue plate mounted on the webbing and adapted to be releasably joined to a seat belt buckle, the guide ring assembly comprising:

a guide member defining a guideway and formed to allow insertion of said intermediate webbing portion into said guideway for supporting said intermediate webbing portion and permitting said intermediate webbing portion to slide freely therethrough, said guide ring comprising an elongated base portion, a pair of support arms attached to said base portion, and a pair of tab portions attached to said support arms, said tab portions being oriented in an overlapping manner and offset with respect to each other;

a spacer inserted between said offset tab portions; and means for affixing said guide member to the frame of the vehicle.

2. The guide ring assembly as set forth in claim 1 wherein said tab portions have mutually aligned mounting holes formed therethrough.

3. The guide ring assembly as set forth in claim 1 wherein said spacer has a mounting hole formed therethrough in alignment with said mounting holes in said guide member.

4. The guide ring assembly as set forth in claim 3 further comprising a cover attached to said spacer.

5. The guide ring assembly as set forth in claim 4 wherein said cover has a relatively straight lower edge in proximity to said base portion of said guide member which together with said base portion defines a restricted guideway to prevent said belt from twisting.

6. The guide ring assembly as set forth in claim 1 wherein said base portion is formed having a cross-section for resisting deformation of said base portion when said webbing portion is under tension.

7. The guide ring assembly as set forth in claim 1 wherein said base portion is formed having a cross-section for preventing said web portion from ripping under tension.

8. A guide for a seat belt, comprising:

an elongated guide member having two ends and a longitudinal axis;

two support arms attached to opposite ends of said guide member so as to form substantially opposite acute angles;

two mounting plates attached to said support arms so as to overlap in a direction substantially perpendicular to said longitudinal axis of said guide member, said plates arranged to form a gap therebetween, said gap formed to allow insertion and removal of an intermediate portion of a belt, said plates being formed with mounting holes arranged such that the respective centers of said holes are aligned;

a spacer inserted between said plates and having a mounting hole formed therethrough in substantial alignment with said holes in said plates; and said guide member, support arms, and plates formed to allow said belt to slide relative thereto, and to support said portion of said belt.

9. The guide as set forth in claim 8 further comprising a cover attached to said spacer, said cover having a relatively straight edge in relative proximity to said elongated guide member to thereby form a restricted guideway for the belt that permits free movement of said belt through said guideway and prevents said belt from twisting.

10. The guide ring assembly of claim 8 wherein said base portion is formed having a cross-section for resisting deformation of said base portion when said webbing portion is under tension.

11. The guide ring assembly of claim 8 wherein said base portion is formed having a cross-section for preventing said web portion from ripping under tension.

12. In an automotive seat belt system for the seat of a vehicle having a frame including a retractor assembly, webbing emanating from the retractor assembly, and a tongue plate mounted on the webbing and adapted to be releasably joined to a seat belt buckle, a guide ring assembly for routing the webbing over the shoulder of the occupant of the seat, comprising:

a unitary generally triangular-shaped member comprising a base portion defining a webbing receiving surface and having a length at least as great as the width of said webbing to permit said webbing to freely pass over said surface of said base portion, and said portions integrally joined at their respective first ends to opposite ends of said base portion and defining mounting means at their respective free ends, said free ends being oriented in an overlapping manner and offset with respect to each other so as to define a slot therebetween to permit said webbing to pass therethrough when mounting said member onto said webbing, wherein said base portion is plastically deformed in the region opposite to said webbing receiving surface for enabling said base portion to resist deformation when said webbing portion is under high tension loads; and fastening means coacting with said mounting means for securing said member to the frame of the vehicle.

13. The guide ring assembly of claim 12 further including cover means for covering said fastening means.

14. The guide ring assembly of claim 13 wherein said cover means presents a lower edge that is spaced from said surface of said base portion and together with said surface of said base portion defines a guideway through which said webbing passes.

15. The guide ring assembly of claim 14 wherein said cover means comprises a main body portion and spacer tab portion that is adapted to fit into said slot and coact with said mounting means to secure said cover means to said member.

16. The guide ring assembly of claim 15 wherein said main body portion is adapted to be removably secured to said spacer tab portion.

17. The guide ring assembly of claim 12 wherein said mounting means comprise flattened tab portions having aligned holes formed therethrough for receiving said fastening means.

18. The guide ring assembly of claim 12 wherein said base portion is plastically deformed so that a cross-sectional dimension of said base portion is increased relative to said side portions.

19. The guide ring assembly of claim 12 wherein said base portion is plastically deformed so as to increase the area of said webbing receiving surface.

20. In an automobile seat belt system for the seat of a vehicle having a frame including a retractor assembly, webbing emanating from the retractor assembly, and a tongue plate mounted on the webbing and adapted to be releasably joined to a seat belt buckle, a guide ring assembly for routing the webbing over the shoulder of the occupant of the seat, comprising:

a unitary generally triangular-shaped member comprising a base portion defining a webbing receiving surface and having a length at least as great as the width of said webbing to permit said webbing to freely pass over said base portion, and side portions integrally joined at their respective first ends to opposite ends of said base portion and defining mounting means at their other ends, wherein said base portion is plastically deformed in the region opposite to said webbing receiving surface so as to increase a cross-sectional dimension of said base portion relative to said side portions for enabling said base portion to resist deformation when said webbing portion is under high tension loads; and fastening means coacting with said mounting means for securing said member to the frame of the vehicle.

21. The guide ring assembly of claim 20 wherein said base portion is plastically deformed so as to increase the area of said webbing receiving surface.

* * * * *